(12) United States Patent
Andrews et al.

(10) Patent No.: US 8,701,040 B2
(45) Date of Patent: Apr. 15, 2014

(54) PANORAMIC GRAPHICAL USER INTERFACE

(75) Inventors: Anton Andrews, Seattle, WA (US); Jeffrey Fong, Seattle, WA (US); Marc S. Doll, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 12/240,729

(22) Filed: Sep. 29, 2008

(65) Prior Publication Data
US 2010/0083165 A1 Apr. 1, 2010

(51) Int. Cl.
*G06F 3/048* (2013.01)

(52) U.S. Cl.
USPC ........... 715/810; 715/716; 715/785; 715/817; 715/828; 715/830

(58) Field of Classification Search
USPC ......... 715/864, 834, 815, 784, 785, 786, 787, 715/848, 778, 828, 817, 829, 830, 810, 716
See application file for complete search history.

(56) References Cited

U.S. PATENT DOCUMENTS

| | | | |
|---|---|---|---|
| 5,724,492 A * | 3/1998 | Matthews et al. | 345/419 |
| 6,184,884 B1 * | 2/2001 | Nagahara et al. | 715/828 |
| 6,559,846 B1 | 5/2003 | Uyttendaele et al. | |
| 6,891,561 B1 | 5/2005 | Achituv et al. | |
| 7,327,349 B2 | 2/2008 | Robbins et al. | |
| 2004/0100479 A1 * | 5/2004 | Nakano et al. | 345/700 |
| 2005/0050163 A1 | 3/2005 | Cole et al. | |
| 2005/0149551 A1 | 7/2005 | Fong et al. | |
| 2006/0161863 A1 * | 7/2006 | Gallo | 715/810 |
| 2007/0150810 A1 * | 6/2007 | Katz et al. | 715/526 |
| 2007/0174785 A1 * | 7/2007 | Perttula | 715/800 |
| 2007/0230824 A1 | 10/2007 | Alvarez | |
| 2008/0034381 A1 * | 2/2008 | Jalon et al. | 719/329 |
| 2008/0066000 A1 | 3/2008 | Ofek et al. | |

FOREIGN PATENT DOCUMENTS

| | | | |
|---|---|---|---|
| WO | 2007129065 A1 | 11/2007 | |
| WO | 2008020461 A1 | 2/2008 | |

OTHER PUBLICATIONS

Mackinlay et al. "The Perspective Wall: Detail and Context Smoothly Integrated." CHI '91 Proceedings of the SIGCHI conference on Human factors in computing systems: Reaching through technology. ACM. 1991. pp. 173-179.*
Spence, Robert and Mark Apperley, "Data Base Navigation: An Office Environment for the Professional," Behavior and Information Technology, 1982, vol. 1, No. 1, 43-54, 14 pages.
"ViaMichelin Navigation X-980T Europe", (Retrieved Jun. 30, 2008), Webpage Available at: http://www.e-bowl.co.uk/products/4994.html.

(Continued)

*Primary Examiner* — Kieu Vu
*Assistant Examiner* — Blaine Basom
(74) *Attorney, Agent, or Firm* — Micah Goldsmith; Glen Johnson; Micky Minhas

(57) ABSTRACT

A panoramic graphical user interface includes a contiguous background and a collection of mixed-media content objects. The contiguous background includes one or more space-orientating graphical elements and is sized to fit within a first dimension of a display and to extend beyond a second dimension of the display. The collection of mixed-media content objects are anchored over the contiguous background. The collection of mixed-media content objects are arranged to fit within the first dimension of the display and arranged to extend beyond the second dimension of the display.

14 Claims, 3 Drawing Sheets

(56) References Cited

OTHER PUBLICATIONS

"360 Panorama Professional 6.1", Last Updated: Mar. 3, 2007, http://www.softpedia.com/get/Authoring-tools/Digital-Album/360-Panorama-Professional.shtml.

"Hotspots Plugin for Flash Panorama Player", 2006, http://flashpanoramas.com/blog/2006/12/14/hotspots-plugin-for-flash-panorama-player/#more-10.

* cited by examiner

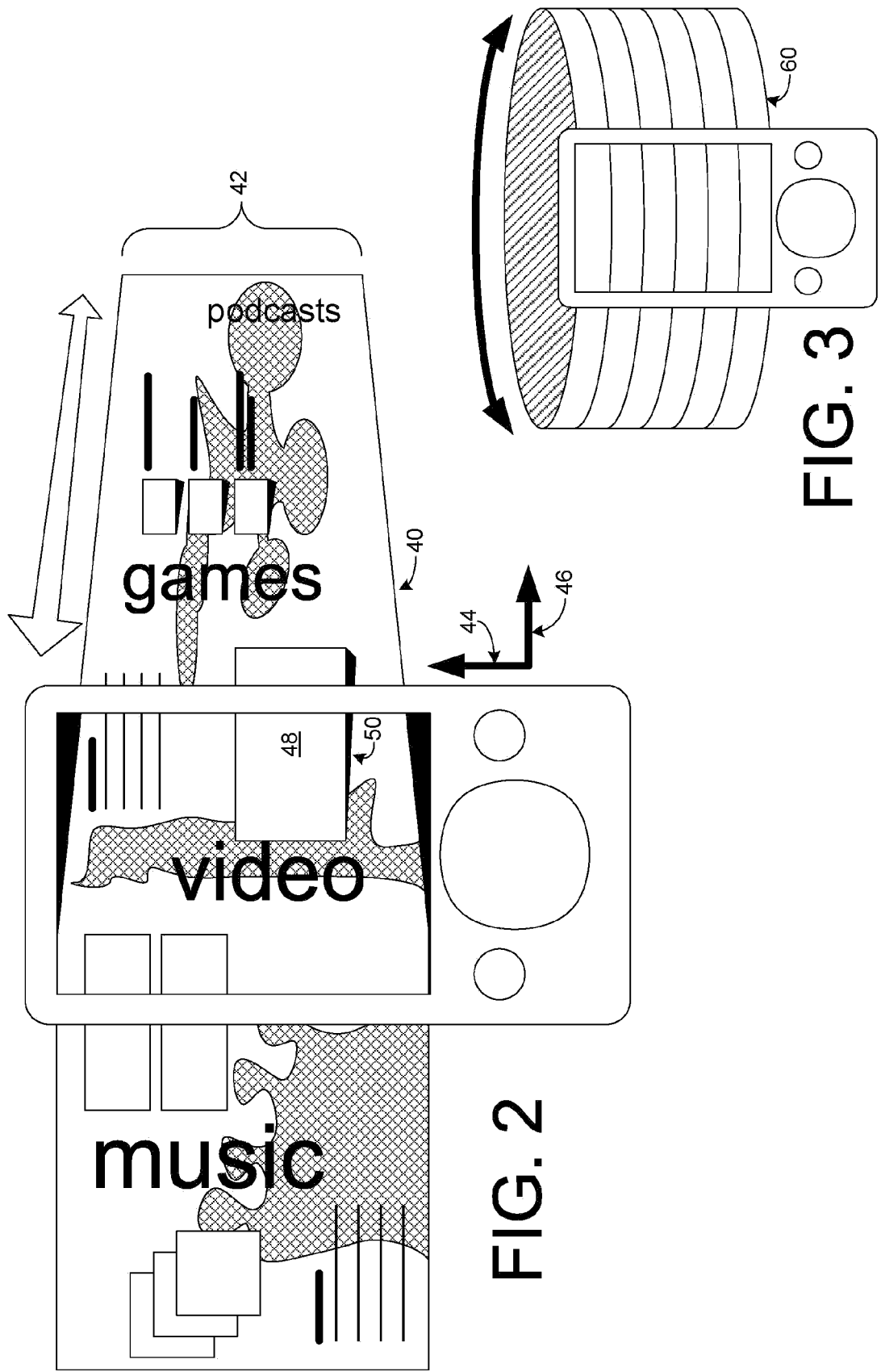

PANORAMIC GRAPHICAL USER INTERFACE

BACKGROUND

Most cellular telephones, personal data assistants, and personal media players utilize a series of discrete, cascading screens to present information to a user. Such screens generally only include lists of homogeneous content, such as a list of contacts, a list of albums, a list of songs, or a list of currently available commands. Some users may find such screens and such lists to be uninspiring. Further, some users may not proactively explore such screens and such lists because of the unrewarding user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A panoramic graphical user interface is disclosed. The panoramic graphical user interface is sized to fit within a first dimension of a display, while extending past the limits of a second dimension of the display. The panoramic graphical user interface may be panned to reveal those portions of the panoramic graphical user interface originally extending beyond the limits of the display. The panoramic graphical user interface includes a collection of mixed-media content objects anchored to a contiguous background including one or more space-orientating graphical elements.

BRIEF DESCRIPTION OF THE DRAWINGS

FIG. 2 shows a three-dimensional panoramic graphical user interface presented on a display of a media-playing device in accordance with an embodiment of the present disclosure.

FIG. 3 shows a circularly-navigable panoramic graphical user interface presented on a display of a media-playing device in accordance with an embodiment of the present disclosure.

DETAILED DESCRIPTION

The present disclosure is directed to a panoramic graphical user interface that provides an immersive user experience that encourages user exploration of content on a media-playing device.

Figure 1:
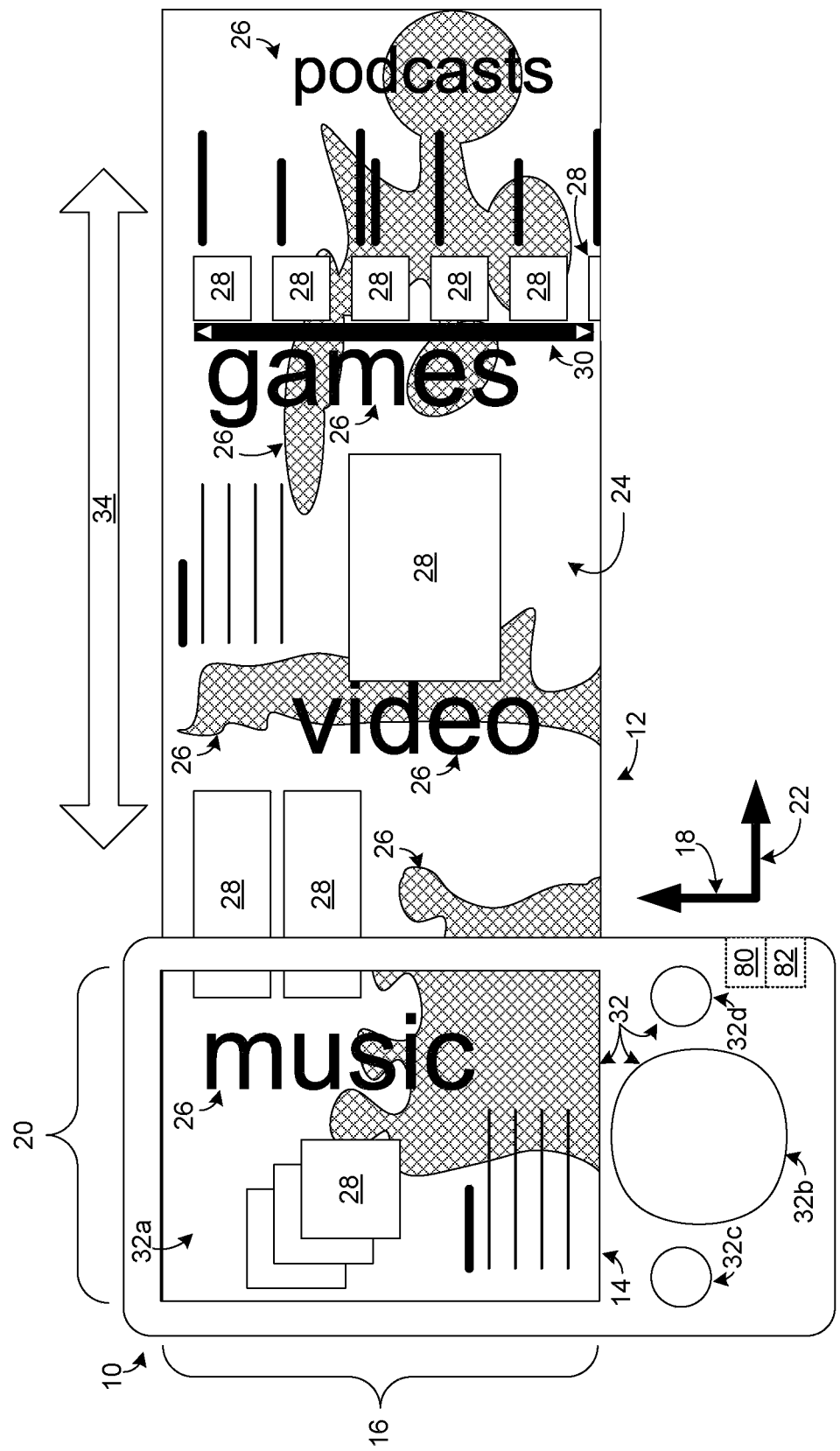
FIG. 1 shows a panoramic graphical user interface presented on a display of a media-playing device in accordance with an embodiment of the present disclosure.

FIG. 1 shows a nonlimiting example of a media-playing device 10 presenting a panoramic graphical user interface 12 in accordance with an embodiment of the present disclosure. It should be understood that while FIG. 1 shows portions of panoramic graphical user interface 12 extending past the boundaries of the media-playing device, such portions of the panoramic graphical user interface are not visible to a user. The drawing is intended to show those portions of the panoramic graphical user interface which are not currently visible to a user, but which may be brought into view as described below.

Media-playing device 10 includes a display 14 for presenting panoramic graphical user interface 12, other user interfaces, applications, data, media content, and/or other content. Display 14 has a first dimension 16 along a first axis 18 and a second dimension 20 along a second axis 22. In the illustrated embodiment, the first dimension is a height dimension and the second dimension is a width dimension. In other embodiments, a display may be shaped differently. For example, while display 14 is formatted with a portrait aspect ratio (i.e., height greater than width), a display with a landscape aspect ratio (i.e., width greater than height), a square aspect ratio, or a non-rectangular aspect ratio may be used without departing from the scope of this disclosure. Further, while panoramic graphical user interface 12 is shown as being horizontally-panable, a vertically-scrollable graphical user interface is within the scope of this disclosure. In some embodiments, the orientation of a display may automatically rotate responsive to the media-playing device being rotated.

Panoramic graphical user interface 12 includes a contiguous background 24 including one or more space-orientating graphical elements 26. In the illustrated embodiment, the space-orientating graphical elements 26 are represented as abstract shapes and stylized words (e.g., "music," "video," "games," and "podcasts"). It should be understood that space-orientating graphical elements 26 may include photographs, graphics, artwork, text, and/or virtually any other visual element. The space-orientating graphical elements provide a visual sense of reference that allows a user to easily perceive when the contiguous background is moving. Furthermore, the space-orientating graphical elements can be used to establish a visual theme, convey information via text, pictures, and/or graphics, and/or encourage interface exploration.

Panoramic graphical user interface 12 also includes a collection of mixed-media content objects 28 anchored over the contiguous background. The mixed-media content objects are schematically represented as white rectangles in FIG. 1.

As used herein, the term anchored means that the mixed-media content objects move with the contiguous background. In other words, the mixed-media content objects do not scroll over the background while the background remains stationary. Instead, the mixed-media content objects and the background move together. It should be understood, however, that some mixed-media content objects may move relative to the contiguous background (e.g., growing, shrinking, rotating, changing form, etc.). Furthermore, in some embodiments, the background can optionally be scrolled at a different speed than the foreground to give the visual perception of parallax, which may help enforce a three-dimensional metaphor of the user interface.

As used herein, mixed-media content objects are used to refer to elements of the panoramic graphical user interface that serve as portals to applications, other user interfaces, media content, and the like. As a nonlimiting example, the mixed-media content objects may include icons that, when selected, launch an application that assumes control of the display from the panoramic graphical user interface. As another nonlimiting example, the mixed-media content objects may include embedded media players that, when selected, play media content from within the panoramic graphical user interface. As still another example, the mixed-media content objects may include scrollable list containers (e.g., scrollable list container 30 in FIG. 1) for holding lists too long to fit within the non-scrollable dimension of the display (e.g., height dimension). Such lists may include text, icons, embedded media players, and/or other user interface elements. While a scrollable list container may be anchored to the contiguous background (e.g., the container moves with the background when the background is panned horizontally), the individual list elements in the container may be unanchored to the contiguous background (e.g., the list elements may be scrolled vertically within the container, thus moving relative to the contiguous background).

A single panoramic graphical user interface may include a variety of different types of mixed-media content objects. In other words, a panoramic graphical user interface may include nonhomogeneous content. As nonlimiting examples, the same panoramic graphical user interface may include a collection of mixed-media content objects that serve as portals to one or more of audio content, video content, Internet content, game content, and/or other types of content, as well as applications configured to present such content.

Panoramic graphical user interfaces in accordance with the present disclosure may be preloaded on a device, or they may be added to a device after the original sale of the device. In other words, a content provider may add to and/or update the contents of the panorama as a package and deliver it to the user. Such a package may be delivered to the user via a removable medium, such as a compact disk or digital versatile disk, via a network connection, such as a personal area network connection, local area network connection, or wide area network connection, and/or via virtually any other suitable distribution mechanism.

As shown in FIG. 1, panoramic graphical user interface 12 is a fixed-height, horizontally-panable graphical user interface. A height of panoramic graphical user interface 12 is sized to fit within first dimension 16 of display 14. In particular, the contiguous background is sized to fit within the first dimension of the display, and the mixed-media content objects are arranged to fit within the first dimension of the display. In contrast, the width of the panoramic graphical user interface is too large to be completely visible at one time using display 14. In particular, the contiguous background is sized to extend beyond the second dimension of the display, and the mixed-media content objects are arranged to extend beyond the second dimension of the display.

Media-playing device 10 also includes an input subsystem 32 configured to translate user input into commands for controlling at least the panoramic graphical user interface. In some embodiments, the input subsystem may include a touch-sensing array 32a registered with the display and configured to detect touch-input directed to the display. As a nonlimiting example, the input subsystem may include a capacitive or resistive touch-sensitive display. In some embodiments, a media-playing device may additionally or alternatively include one or more physical buttons, dials, track pads, and/or other controls separate from the display (e.g., control pad 32b, button 32c and button 32d).

The input subsystem can be used by a user to control the media-playing device. As a nonlimiting example, the input subsystem may be used to translate user input into a pan command, which operatively moves the contiguous background and collection of mixed-media content objects so as to change which portions of the contiguous background and which portions of the collection of mixed-media content objects are presented by the display. Arrows 34 are used to show the direction of such panning in FIG. 1. It should be noted that panning is only performed along one axis (e.g., horizontal axis), because the panoramic user interface is sized to fit within one dimension of the display (e.g., height dimension).

It should be understood that the panoramic graphical user interface may be panned in an unrestricted manner. In other words, a user can pan the user interface to any desired position. The panoramic graphical user interface need not pan by increments the same width as the display. Further, such panning may be presented as a visually smooth movement of the panoramic graphical interface across the display. Additionally, one or more sections of the panorama may be weighted so that the panorama may be panned with an unrestricted flow, but at the same time naturally favors stopping on weighted sections of particular interest. Weighted sections may be used to decrease the likelihood that a user will stop panning on a less useful section of the panorama.

As shown in FIG. 2, in some embodiments, a panoramic graphical user interface 40 may be presented so as to create the illusion that the panoramic graphical user interface is a three-dimensional interface that emerges from behind a display. To help establish such an illusion, a dimension 42 of the contiguous background parallel with a first axis 44 may decrease along a second axis 46 of the display. For example, as shown in FIG. 2, a height of the panoramic graphical user interface may decrease from left to right. As the panoramic graphical user interface is panned, different portions of the interface will be presented by the display and given a three-dimensional appearance.

The three-dimensional appearance of the panoramic graphical user interface may be modified by changing the rate at which a dimension (e.g., height) of the interface changes. Further, the three-dimensional appearance may be modified by changing what percentage of the display shows a three-dimensional view of the interface. For example, FIG. 2 shows approximately the right 75% of the display presenting a three-dimensional view of panoramic graphical user interface 12. More or less of the display may be used to present a three-dimensional view of the panoramic graphical user interface. In some embodiments, the rate at which a dimension of the interface changes and/or the amount of the display that is used to present the three-dimensional view may change as the interface is being panned (e.g., responsive to pan speed).

In some embodiments, the portion of the display that presents the three-dimensional view of the interface may change when panning moves from left to right, or vice versa. For example, the interface may have a decreased height at the right side of the display when the interface is being panned from right to left, and the interface may have a decreased height at the left side of the display when the interface is being panned from left to right.

In some embodiments in which the panoramic graphical user interface is presented with a three-dimensional appearance, one or more of the mixed-media content objects may be presented so as to appear to project out from the contiguous background. As an example, a height dimension of mixed-media content object 48 does not decrease along the width of the display. As shown in FIG. 2, a drop shadow 50 or other graphical element can be used to further support the appearance that the mixed-media content object projects from the contiguous background.

As schematically shown in FIG. 3, in some embodiments, a panoramic graphical user interface 60 may be wrapped into a circularly-navigable ring. In other words, the contiguous background and collection of mixed-media content objects may automatically repeat as a user pans in a single direction. In such embodiments, the panoramic graphical user interface does not have ends that block further panning. In some embodiments in which the panoramic graphical user interface is wrapped into a circularly-navigable ring, what would be the ends of the interface may be stylistically matched with each other so as to seamlessly blend together.

A panoramic graphical user interface in accordance with the present disclosure may be designed to present a collection of mixed-media content in a manner that encourages a user to pan the panoramic graphical user interface to find more content. At the same time, the fixed-height design of the panoramic graphical user interface limits the risk that a user will not be able to find some content made available by the interface, as may happen if panning were available along two separate axes.

Figure 4:
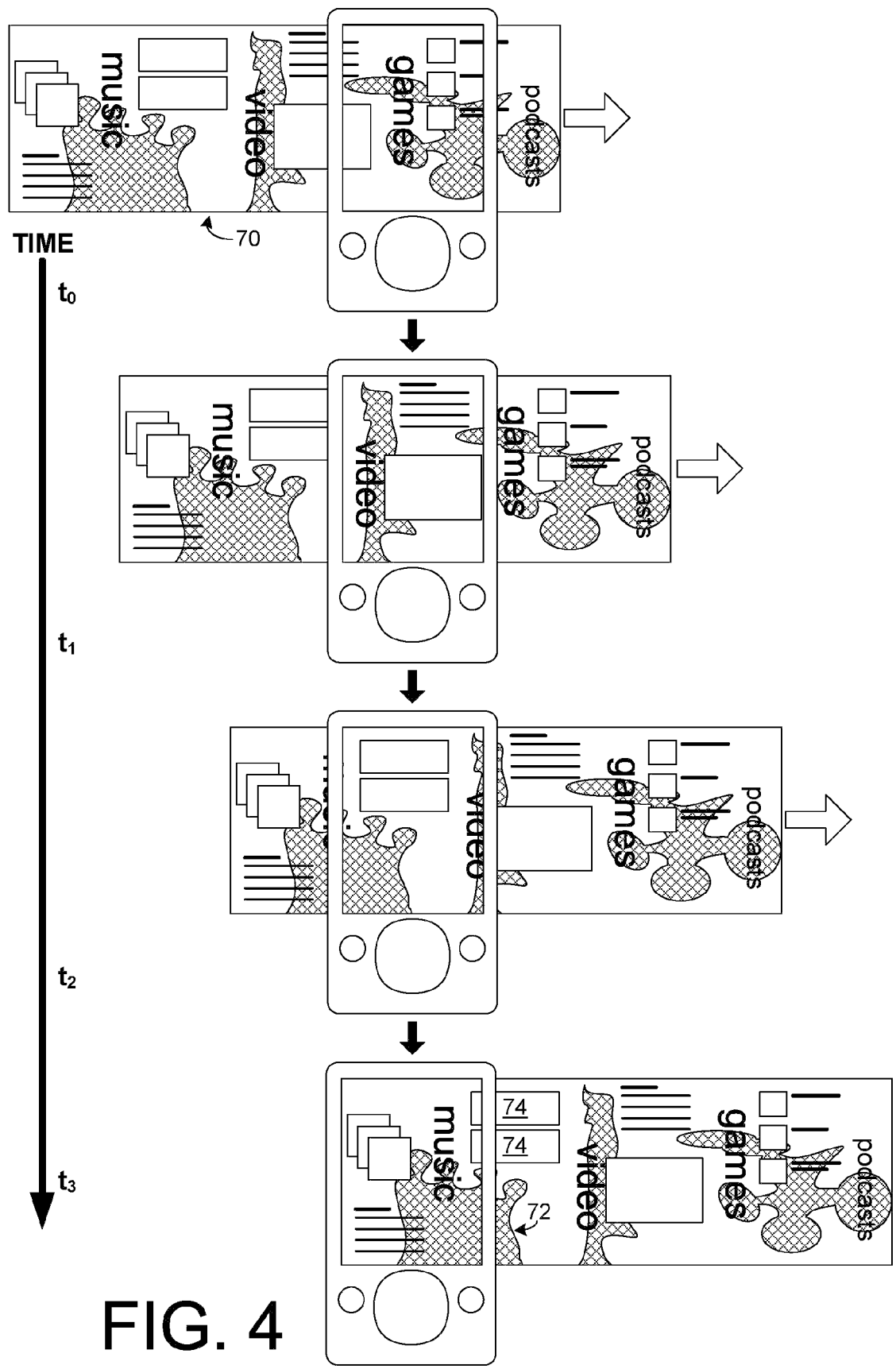
FIG. 4 shows an opening-sequence pan automatically executed after launching a panoramic graphical user interface in accordance with an embodiment of the present disclosure.

In some embodiments, a panoramic graphical user interface launches with an opening sequence that automatically pans across at least a portion of the contiguous background and collection of mixed-media content objects. For example, FIG. 4 shows an opening sequence that automatically pans across a panoramic graphical user interface 70 presented on a display. FIG. 4 shows the display at four different moments in time (i.e., $t_0$, $t_1$, $t_2$, and $t_3$), with time progressing from the top of the drawing to the bottom of the drawing. While shown at four discrete moments in time, it should also be understood that a pan may be a smooth transition across the panoramic graphical user interface.

The duration of the pan in the opening sequence can be selected to be long enough to provide a user with a visual cue that the panoramic graphical user interface includes more content than can be viewed on the display at one time. At the same time, the duration of the opening-sequence pan can be selected to be short enough so as to limit interfering with a user's ability to control the panoramic graphical user interface. In some embodiments, the opening-sequence pan may be executed only the first time the panoramic graphical user interface is launched. In some embodiments, the opening sequence can perform the automatic pan until a user demonstrates proficiency with panning, at which point the opening-sequence pan may be skipped or shortened. In some embodiments, a user may interrupt the opening sequence by beginning a pan command or by providing other user input.

When launched, the panoramic graphical user interface can be presented with a desired portion presented on the display. In some embodiments, the panoramic graphical user interface can be presented so that some elements from the contiguous background and/or collection of mixed-media content objects are only partially visible, thus encouraging a user to pan the interface to bring such items into full view. For example, one or more space-orientating graphical elements 72 may be left partially visible on the display and partially extending beyond the boundaries of the display. As another example, one or more mixed-media content objects 74 may be left partially visible on the display and partially extending beyond the second dimension of the display.

The panoramic graphical user interface may be configured to automatically go to a specific part of the panorama based on context, preference, history, or another suitable factor. Such an automatic positioning of the interface can occur when the interface is launched, or responsive to any other suitable event (e.g., activation of a shortcut, navigation button, home key, etc.).

Turning back to FIG. 1, media-playing device 10 may also include a memory 80 and a logic subsystem 82. Logic subsystem 82 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 80 may include one or more physical devices configured to hold data and/or instructions that, when executed by the logic subsystem, cause the logic subsystem to implement the herein described methods and processes. Memory 80 may include removable media and/or built-in devices. Memory 80 may include optical memory devices, semiconductor memory devices, and/or magnetic memory devices, among others. Memory 80 may include portions with one or more of the following characteristics: volatile, non-volatile, dynamic, static, read/write, read-only, random access, sequential access, location addressable, file addressable, and content addressable. In some embodiments, logic subsystem 82 and memory 80 may be integrated into one or more common devices and/or computing systems (e.g., system on a chip).

Memory 80 may, for example, hold instructions that, when executed by logic subsystem 82, instantiate a fixed-height panoramic graphical user interface as described above. As another example, the memory may hold instructions that initiate, upon launching of the panoramic graphical user interface, an opening sequence that automatically pans across at least a portion of the contiguous background and collection of mixed-media content objects. In some embodiments, the memory and/or processing subsystem may also be used to perform numerous functions beyond the user interface functions described above.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A media-playing device, comprising:
 a display to present a full-screen panoramic graphical user interface, the display having a first dimension along a first axis and a second dimension along a second axis, the full-screen panoramic graphical user interface comprising:
  a contiguous background of two or more space-orientating graphical elements, each space-orientating graphical element visually distinct from one or more other space-orientating graphical elements, the contiguous background sized to fit within the first dimension of the display and sized to extend beyond the second dimension of the display; and
  a collection of mixed-media content objects anchored over the contiguous background, the collection of mixed-media content objects arranged to fit within the first dimension of the display and arranged to extend beyond the second dimension of the display; and an input subsystem to translate user input into commands for controlling at least the full-screen panoramic graphical user interface, such commands including a pan command for moving the contiguous background and collection of mixed-media content objects along the second axis so as to change which portions of the contiguous background and which portions of the collection of mixed-media content objects are presented by the display, where the full-screen panoramic graphical user interface launches with an opening sequence that begins with an opening view of mixed-media content objects and automatically pans across a collection of mixed-media content objects over at least a portion of the contiguous background to an ending view of different mixed-media content objects and leaves one or more space-orientating graphical elements partially visible on the display and partially extending beyond the second dimension of the display; where the pan command is useable to return to the opening view and where the mixed-media content objects include icons that, when selected, launch an application that assumes control of the display from the full-screen panoramic graphical user interface.

2. The media-playing device of claim 1, where the opening sequence leaves one or more mixed-media content objects partially visible on the display and partially extending beyond the second dimension of the display.

3. The media-playing device of claim 1, where the contiguous background and collection of mixed-media content objects are wrapped into a circularly-navigable ring.

4. The media-playing device of claim 1, where a dimension of the contiguous background parallel with the first axis decreases from an interior of the full-screen panoramic graphical user interface to an edge of the full-screen panoramic graphical user interface along the second axis of the display.

5. The media-playing device of claim 4, where a dimension parallel with the first axis for each mixed-media content object does not decrease along the second axis of the display.

6. The media-playing device of claim 1, where the mixed-media content objects include embedded media players that, when selected, play media content from within the full-screen panoramic graphical user interface.

7. The media-playing device of claim 1, where the mixed-media content objects include scrollable list containers for holding lists too long to fit within the first dimension of the display.

8. The media-playing device of claim 1, where the input subsystem includes a touch-sensing array registered with the display and configured to detect touch-input directed to the display.

9. The media-playing device of claim 1, where the first dimension is height and the second dimension is width.

10. A media-playing device, comprising:

a display to present a horizontally-panable full-screen panoramic graphical user interface, the full-screen panoramic graphical user interface comprising:

a contiguous background of two or more space-orientating graphical elements, each space-orientating graphical element visually distinct from one or more other space-orientating graphical elements, where a height of the contiguous background decreases from an interior of the full-screen panoramic graphical user interface to an edge of the full-screen panoramic graphical user interface; and a collection of mixed-media content objects anchored over the contiguous background, where a height of each mixed-media content object does not decrease from the interior of the full-screen panoramic graphical user interface to the edge of the full-screen panoramic graphical user interface; and an input subsystem to translate user input into commands for controlling at least the full-screen panoramic graphical user interface, such commands including a pan command for horizontally-panning the contiguous background and collection of mixed-media content objects so as to change which portions of the contiguous background and which portions of the collection of mixed-media content objects are presented by the display, where the full-screen panoramic graphical user interface launches with an opening sequence that begins with an opening view of mixed-media content objects and automatically pans across a collection of mixed-media content objects over at least a portion of the contiguous background to an ending view of different mixed-media content objects and leaves one or more space-orientating graphical elements partially visible on the display; where the pan command is useable to return to the opening view and where the mixed-media content objects include icons that, when selected, launch an application that assumes control of the display from the full-screen panoramic graphical user interface.

11. A memory holding instructions that, when executed by a logic subsystem, instantiate a fixed-height full-screen panoramic graphical user interface including a contiguous background of two or more space-orientating graphical elements, on a display each space-orientating graphical element visually distinct from one or more other space-orientating graphical elements, and a collection of mixed-media content objects anchored over the contiguous background, where upon launching of the full-screen panoramic graphical user interface, an opening sequence begins with an opening view of mixed-media content objects and automatically pans across a collection of mixed-media content objects over at least a portion of the contiguous background to an ending view of different mixed-media content objects and leaves one or more space-orientating graphical elements partially visible on the display, the memory further holding instructions that, when executed by the logic subsystem, translate user input into commands for controlling at least the full-screen panoramic graphical user interface, such commands including a pan command for moving the contiguous background and collection of mixed-media content objects along a horizontal axis so as to change which portions of the contiguous background and which portions of the collection of mixed-media content objects are presented by the display; where the pan command is useable to return to the opening view and where the mixed-media content objects include icons that, when selected, launch an application that assumes control of the display from the full-screen panoramic graphical user interface.

12. The memory of claim 11, where the contiguous background and collection of mixed-media content objects are wrapped into a circularly-navigable ring.

13. The memory of claim 11, where a height of the contiguous background decreases from an interior of the full-screen panoramic graphical user interface to an edge of the full-screen panoramic graphical user interface along a width of the contiguous background.

14. The memory of claim 11, where a height of each mixed-media content object does not decrease along a width of that mixed-media content object.

* * * * *